US008918642B2

(12) United States Patent
Halberstadt

(10) Patent No.: US 8,918,642 B2
(45) Date of Patent: Dec. 23, 2014

(54) PROTECTION OF SECRET VALUE USING HARDWARE INSTABILITY

(75) Inventor: Meir Halberstadt, Nof Ayalon (IL)

(73) Assignee: Cisco Technology Inc., San Jose, CA (US)

( * ) Notice: Subject to any disclaimer, the term of this patent is extended or adjusted under 35 U.S.C. 154(b) by 337 days.

(21) Appl. No.: 13/377,383

(22) PCT Filed: Dec. 13, 2009

(86) PCT No.: PCT/IB2009/055724
§ 371 (c)(1),
(2), (4) Date: Jan. 12, 2012

(87) PCT Pub. No.: WO2010/143024
PCT Pub. Date: Dec. 16, 2010

(65) Prior Publication Data
US 2012/0110676 A1    May 3, 2012

(30) Foreign Application Priority Data

Jun. 10, 2009   (IL) .......................................... 199272

(51) Int. Cl.
*G06F 21/57*   (2013.01)
*G06F 21/55*   (2013.01)

(52) U.S. Cl.
CPC .................................... *G06F 21/558* (2013.01)
USPC ....................................................... 713/164

(58) Field of Classification Search
CPC ............ G06F 1/10; G06F 21/00; G01F 1/56; G01F 1/66
USPC ................... 726/5, 14, 30; 713/164, 166, 171
See application file for complete search history.

(56) References Cited

U.S. PATENT DOCUMENTS

| 5,757,923 A | 5/1998 | Koopman, Jr. |
| 6,927,580 B2 | 8/2005 | Wuidart et al. |
| 7,302,458 B2 | 11/2007 | Hars et al. |
| 7,440,426 B2 * | 10/2008 | Antonio et al. ............... 370/318 |

(Continued)

FOREIGN PATENT DOCUMENTS

| EP | 1 429 227 A2 | 6/2004 |
| EP | 1 650 696 A1 | 4/2006 |
| JP | 60-85637 | 10/1983 |
| JP | 64-31239 | 7/1987 |

(Continued)

OTHER PUBLICATIONS

International Search Report and Written Opinion for International Application No. PCT/IB2009/055724, dated Apr. 6, 2010 (11 pages).

(Continued)

*Primary Examiner* — Edward Zee
*Assistant Examiner* — Leynna Truvan
(74) *Attorney, Agent, or Firm* — Husch Blackwell LLP

(57) ABSTRACT

A method for data security, comprising providing an electronic circuit, which has a first, stable operating mode under a first operating condition and a second, unstable operating mode under a second operating condition, different from the first operating condition, and which is configured to output a secret value in the first operating mode; maintaining the electronic circuit initially in the second operating condition; transferring the electronic circuit to the first operating condition and, while in the first operating condition, reading out the secret value; and returning the electronic circuit to the second operating condition after reading out the secret value.

18 Claims, 2 Drawing Sheets

(56) References Cited

U.S. PATENT DOCUMENTS

| | | | |
|---|---|---|---|
| 2003/0102960 A1* | 6/2003 | Beigel et al. | 340/10.1 |
| 2003/0133241 A1 | 7/2003 | Feuser et al. | |
| 2004/0189355 A1 | 9/2004 | Walmsley | |
| 2004/0264273 A1 | 12/2004 | Pockrandt | |
| 2005/0210280 A1* | 9/2005 | Paatero | 713/200 |
| 2006/0133607 A1 | 6/2006 | Forehand et al. | |

FOREIGN PATENT DOCUMENTS

| | | |
|---|---|---|
| WO | WO 01/61502 | 8/2001 |
| WO | WO 2008/015603 | 2/2008 |

OTHER PUBLICATIONS

Bolotnyy, et al., "New Directions in Detection, Security and Privacy for RFID," Department of Computer Science, University of Virginia, Thesis, PowerPoint Presentation 2007 (pp. 1-24).

Bolotnyy et al., "Physically Unclonable Function-Based Security and Privacy in RFID Systems," Proc. IEEE International Conference on Pervasive Computing and Communications (PerCom 2007), New York, Mar. 2007, (pp. 211-218).

Suh et al., "Physical Unclonable Functions for Device Authentication and Secret Key Generation," Proceedings of the 44th Design Automation Conference (*DAC'07*), San Diego, CA, Jun. 2007 (6 pgs).

Gassend et al., "Silicon Physical Random Functions," In Proc. of the $9^{th}$ ACM Conference on Computer and Communications Security, Nov. 2002 (13 pages).

Wikipedia—"Flip-Flop (electronics)," http://en.wikipedia.org/wiki/Setup_time (16 pages), Feb. 9, 2012.

Wikipedia—"Metastability in electronics," retrieved from http://en.wikipedia.org/wiki/Metastability_in_electronics (3 pages), Jan. 26, 2012.

\* cited by examiner

PROTECTION OF SECRET VALUE USING HARDWARE INSTABILITY

FIELD OF THE INVENTION

The present invention relates generally to electronic circuits, and specifically to circuits that are used to store secrets.

BACKGROUND OF THE INVENTION

A flip-flop is an electronic circuit that has two stable states and thus is capable of serving as one bit of memory. (The term "flip-flop" is used, in the context of the present patent application and in the claims, to denote both clocked flip-flops and transparent flip-flops, commonly known as latches.) Violation of the prescribed operating conditions of a flip-flop can cause metastability, in which the logical state of the flip-flop oscillates unpredictably before settling in a random stable state. For example, metastability may occur if the data input of a clocked flip-flop changes during the prescribed setup time period before the triggering clock transition and/or the prescribed hold time period following a given clock transition.

Generally, digital logic circuits are designed to avoid metastable conditions. In some applications, however, a circuit may be designed intentionally for metastability. For example, U.S. Pat. No. 7,302,458, whose disclosure is incorporated herein by reference, describes a random number generator using metastable elements that are synchronized by a set of flip-flops. The output of the stabilizing flip-flops is compared and used to generate counter events.

SUMMARY OF THE INVENTION

Embodiments of the present invention that are described hereinbelow use circuit instabilities in a novel way to protect a secret value that is held or generated by the circuit.

There is therefore provided, in accordance with an embodiment of the present invention, a method for data security that includes providing an electronic circuit, which has a first, stable operating mode under a first operating condition and a second, unstable operating mode under a second operating condition, different from the first operating condition, and which is configured to output a secret value in the first operating mode. The electronic circuit is maintained initially in the second operating condition. The electronic circuit is transferred to the first operating condition and, while in the first operating condition, the secret value is read out. The electronic circuit is returned to the second operating condition after reading out the secret value.

In one embodiment, the first and second operating conditions correspond to application of different, respective, first and second operating voltages to the electronic circuit, and transferring the electronic circuit includes switching from the second to the first operating voltage. In another embodiment, the first and second operating conditions correspond to application of clock pulses at different, respective, first and second clock rates to the electronic circuit, and transferring the electronic circuit includes switching from the second to the first clock rate. Additionally or alternatively the first and second operating conditions correspond to different, respective, first and second operating temperatures of the electronic circuit, and transferring the electronic circuit includes changing from the second to the first operating temperature.

In some embodiments, transferring the electronic circuit includes receiving a control signal requesting the secret value, and switching momentarily from the second to the first operating condition in response to the control signal.

In a disclosed embodiment, the electronic circuit includes a flip-flop, which is metastable in the second operating mode and stable in the first operating mode.

There is also provided, in accordance with an embodiment of the present invention, a data security device, including an electronic circuit, which has a first, stable operating mode under a first operating condition and a second, unstable operating mode under a second operating condition, different from the first operating condition, and which is configured to output a secret value in the first operating mode. Means for controlling the operating condition of the electronic circuit maintain the electronic circuit initially in the second operating condition, transfer the electronic circuit to the first operating condition so as to cause the electronic circuit to output the secret value, and return the electronic circuit to the second operating condition after the secret value has been output.

The present invention will be more fully understood from the following detailed description of the embodiments thereof, taken together with the drawings in which:

DETAILED DESCRIPTION OF EMBODIMENTS

Secret values, such as keys used in encryption and decryption functions, are commonly stored in electronic memory. There are means known in the art for preventing unauthorized readout of secret values while the memory is intact, but hackers have become increasingly sophisticated in their ability to overcome these means, including by opening up and physically reading out the secret contents of memory chips.

Embodiments of the present invention use variable physical conditions and circuit instabilities to conceal a secret value in an electronic circuit. The circuit in these embodiments is designed to have a stable operating mode under certain operating conditions but to be unstable under other operating conditions. The correct secret value is generated and output by logic in the circuit only in the stable operating mode. Typically, ambient conditions of the circuit result in unstable operation, so that the secret value is unavailable. The operating condition of the circuit is transferred to the stable mode only when needed in order to read out the secret value. The time during which the circuit operates stably may be very short—as little as a single clock cycle, and the circuit may be returned to the ambient conditions and unstable operation immediately thereafter.

Thus, the secret value cannot be found by opening the circuit, nor can it be extracted in normal, ambient operation of the circuit. Even reverse-engineering analysis of the circuit will still fail to reveal the secret, as long as the analysis does not take the detailed effects of the operating conditions of the circuit into account. The variable operating conditions that may be used in hiding the secret in the circuit may comprise the operating voltage, clock rate, or temperature of the circuit, for example, as well as other factors, or a combination of these factors.

Figure 1:
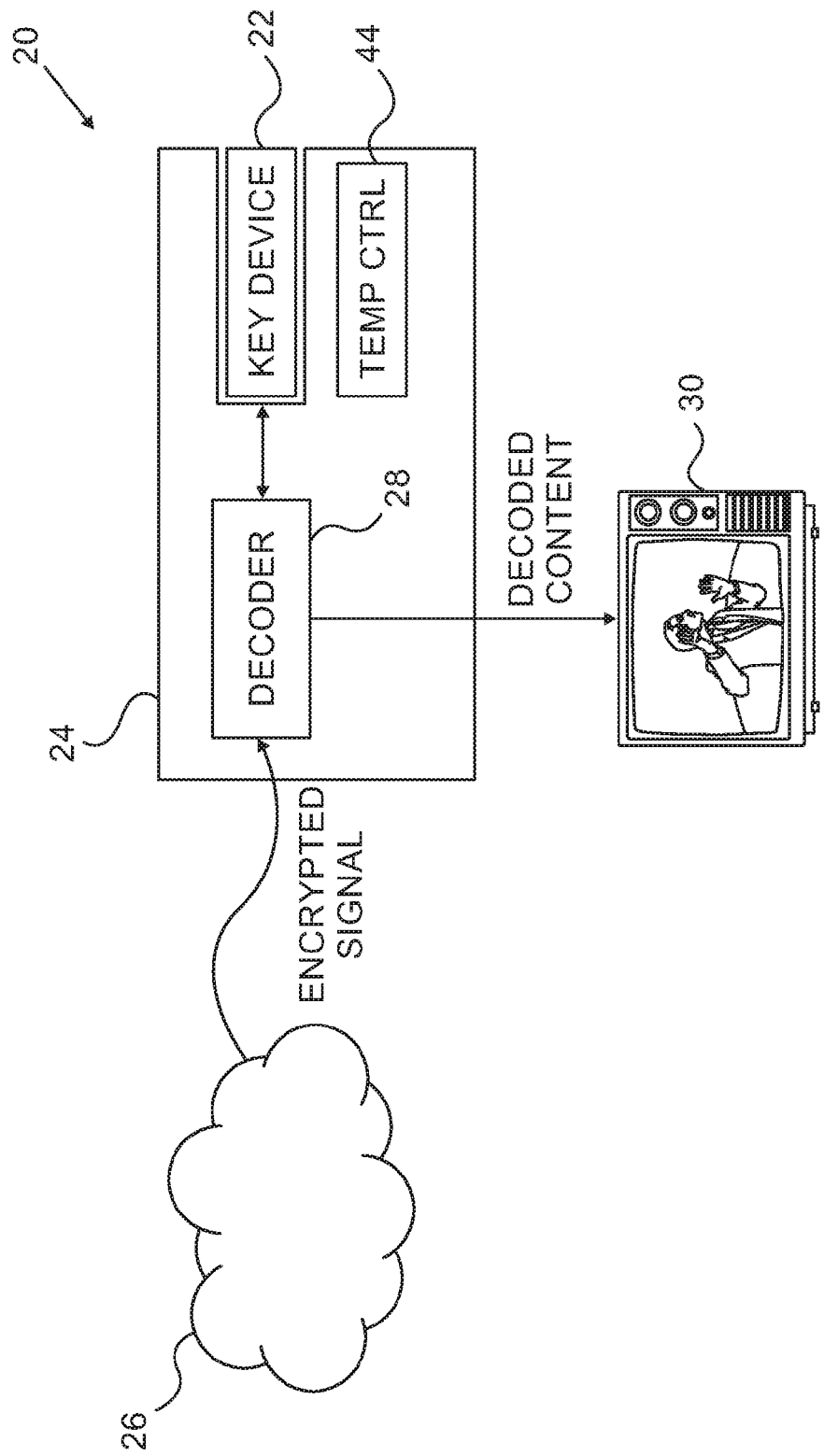
FIG. 1 is a block diagram that schematically illustrates a system for data security, in accordance with an embodiment of the present invention.

FIG. 1 is a block diagram that schematically illustrates a system 20 for data security, in accordance with an embodiment of the present invention. System 20 uses a data protection device 22 to provide a secret key for use by a computing device 24 in decoding encrypted signals received from a network 26. For example, device 24 may comprise a media player, such as a set-top box, which receives digital video programs over a wireless or terrestrial network. In this sort of application, the programs are encrypted to prevent unauthorized viewing or copying, and device 22 may comprise a smart card, USB key, or other plug-in unit that is distributed to subscribers to enable decryption and viewing of the programs on a video display 30.

Alternatively, device 24 may comprise substantially any other type of computer or other electronic device that uses secret values for decryption, encryption, access control, or any other suitable application. Data protection device 22 may be made as a plug-in unit, as shown in FIG. 1, or it may alternatively be an integral part of the computing device that it enables.

Returning to the application shown in FIG. 1, encrypted signals from network 26 are received by a decoder 28 in device 24. Decoder 28 reads a secret key value from device 22 and uses this value in decrypting the signals. The key value may be fixed, or it may change from time to time, as is known in the art. As noted above, device 22 is controlled to output the correct key value only under certain conditions that cause device 22 to operate in a stable mode. The appropriate conditions may be invoked momentarily, for example, in response to a trigger signal from decoder 28, indicating that the key value is needed.

Additionally or alternatively, the appropriate conditions for stable operation of device 22 may be provided by the operating environment within device 24, while such conditions generally do not prevail in the ambient environment outside device 24. For example, device 24 may comprise a temperature controller 44, which holds device 22 at a specific design temperature, at which device 22 operates in the stable mode. Typically (although not necessarily) the design temperature for stable operation is cooler than the ambient temperature. Outside a narrow temperature window around the design temperature, device 22 may operate unstably. Therefore, a hacker who attempts to extract a secret value from device 22 at a temperature outside the window will be unable to do so.

Figure 2:
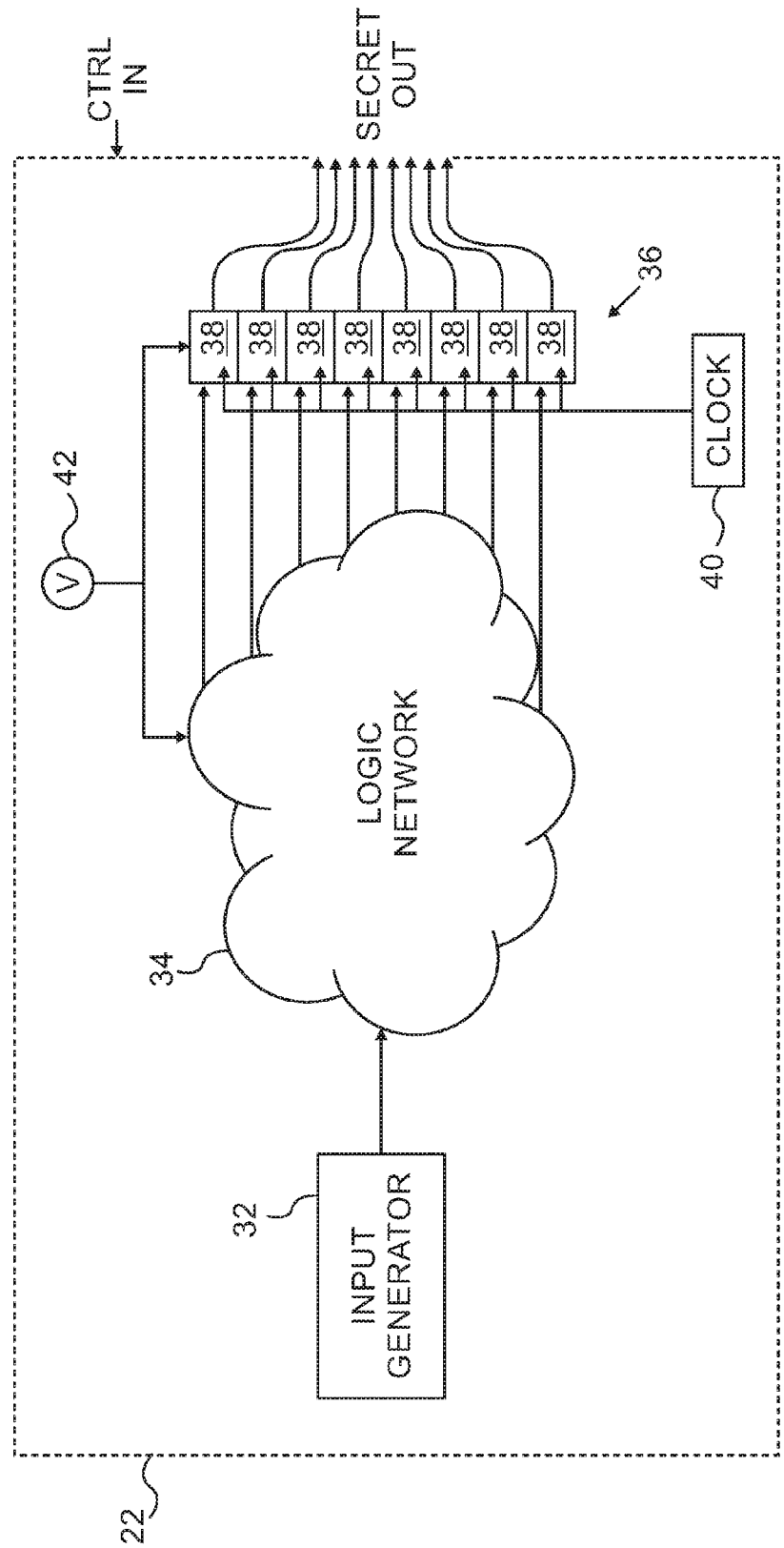
FIG. 2 is a block diagram that schematically shows details of data protection device, in accordance with an embodiment of the present invention.

FIG. 2 is a block diagram that schematically shows details of data protection device 22, in accordance with an embodiment of the present invention. The circuit elements shown in this figure may be fabricated, for example, as components of an application-specific integrated circuit (ASIC), comprising an array of logic gates with suitable interconnections. Alternatively, any other suitable type of integrated circuit may be used for this purpose, such as a full-custom device or a field-programmable gate array (FPGA).

An input generator 32 produces a starting value for input to a combinatorial logic network 34. The input generator may simply comprise a set of registers, which hold fixed values, or it may be configured to generate a variable output, in either a deterministic fashion (such as a sequence of constants or a one-time password function) or a random fashion. For example, input generator 32 may comprise a random number generator or a physical unclonable function (PUF) circuit. Network 34 may comprise a complex design, with many gates, in order to make reverse engineering more difficult. Additionally or alternatively, the network may comprise long conductors, which contribute to the instability of its operation.

Logic network 34 outputs a secret value to an output register 36, comprising an array of flip-flops 38. This secret value is read out of device 22 by decoder 28 at the appropriate time. A power supply 42 supplies operating voltage to elements of device 22, including particularly logic network 34 and flip-flops 38. The timing of the flip-flops (as well as of the logic network) is controlled by a clock generator 40. Either the power supply or the clock generator, or both, as well as the temperature of the logic network, may be used to switch the operating condition of device 22 between unstable and stable operating modes, as is explained further hereinbelow.

In embodiments of the present invention, logic network 34, including its connections to flip-flops 38, is designed intentionally with marginal timing. This timing may be determined at the "place and route" step of the design of network 34, using electronic design automation (EDA) tools that are known in the art. The actual timing depends on the operating conditions of the circuits and typically varies with operating voltage and temperature, in a way that EDA tools are able to model. Thus, the designer of logic network 34 may, for example, choose the lengths of the conductors in the network so that at a certain operating voltage, such as 1.8 volts, the logic network outputs the secret value for a period that satisfies the setup time and hold time constraints of flip-flops 38, but does not satisfy these constraints at other operating voltages, such as 3.3 volts. Thus, register 36 will contain the correct secret value only when power supply 42 is set to 1.8 volts, whereas at 3.3 volts, at least some of the flip-flops will contain a random value due to their metastable condition.

Typically, decoder 28 provides a control input to device 22 when it is ready to receive a secret value. Power supply 42 may normally operate at 3.3 volts, so that register 36 contains a random value. In response to the control input, however, power supply 42 may switch to supplying 1.8 volts, whereupon the correct secret value will be loaded into the register for readout by the decoder. The power supply may, for example, comprise a dual-output regulator with a switch, which switches the voltage supplied to all or part of the logic network and flip-flops on command. Alternatively, a voltage divider or other switched load, or any other suitable means known in the art, may be used for this purpose. If only a part of the logic network operates at the lower voltage, buffering may be needed in order to separate the high- and low-voltage parts of the network, so as to prevent DC current flow through the network, for example. The voltage may be switched momentarily, only for as long as is needed to read out the secret value—possibly for just a single clock cycle, in order to make it harder for an unauthorized party to discover the value.

As another alternative, the rate of clock generator 40 may be switched briefly from one frequency at which flip-flops 38 are metastable, to another frequency at which they stably provide the correct secret value.

The voltage or clock switching described above may be applied to all of logic network 34, or it may alternatively be applied only to certain components, particularly flip-flops 38 and possibly other associated components.

In another embodiment, as noted above, network 34 may be designed so that at ambient operating temperatures, flip-flops 38 are metastable, and become stable only when device is held at the appropriate design temperature. (This approach, however, is less suitable for applications in which it is desired that the secret value appear only momentarily on the output of device 22.)

Thus, to summarize, power supply 42, clock generator 40 and temperature controller 44 may serve, individually or in combination, as means for controlling the operating condition of the electronic circuits in device 22. Other means will be apparent to those skilled in the art upon reading the present patent application and are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data security, comprising:
   providing an electronic circuit having a first, stable operating mode under a first operating condition and a second, unstable operating mode under a second operating condition, the second operating condition being different from the first operating condition, the electronic circuit being configured to output a correct secret value only in the first operating mode;
   maintaining the electronic circuit initially in the second operating condition;
   transferring the electronic circuit to the first operating condition and, while in the first operating condition, reading out the secret value; and
   returning the electronic circuit to the second operating condition after reading out the secret value;
   wherein, for given circuit operating conditions, the electronic circuit has a stable operating mode if an output value of a particular circuit characteristic is predictable and the electronic circuit has an unstable operating mode if the output value of the particular circuit characteristic is not predictable.

2. The method according to claim 1,
   wherein the first operating condition corresponds to application of a first operating voltage to the electronic circuit and the second operating condition corresponds to application of a second operating voltage to the electronic circuit, the first operating voltage being different from the second operating voltage, and
   wherein transferring the electronic circuit comprises switching from the second to the first operating voltage.

3. The method according to claim 1,
   wherein the first operating condition corresponds to application of clock pulses at a first clock rate to the electronic circuit and the second operating condition corresponds to application of clock pulses at a second clock rate to the electronic circuit, the first clock rate being different from the second clock rate, and
   wherein transferring the electronic circuit comprises switching from the second to the first clock rate.

4. The method according to claim 1,
   wherein the first operating condition corresponds to a first operating temperature of the electronic circuit and the second operating condition corresponds to a second operating temperature of the electronic circuit, the first operating temperature being different from the second operating temperature, and
   wherein transferring the electronic circuit comprises changing from the second to the first operating temperature.

5. The method according to claim 1, wherein transferring the electronic circuit comprises receiving a control signal requesting the secret value, and switching momentarily from the second to the first operating condition in response to the control signal.

6. The method according to claim 1, wherein the electronic circuit comprises a flip-flop, which is metastable in the second operating mode and stable in the first operating mode.

7. A data security device, comprising:
   an electronic circuit having a first, stable operating mode under a first operating condition and a second, unstable operating mode under a second operating condition, the second operating condition being different from the first operating condition, the electronic circuit being configured to output a correct secret value only in the first operating mode; and
   means for controlling the operating condition of the electronic circuit, so as to maintain the electronic circuit initially in the second operating condition, to transfer the electronic circuit to the first operating condition so as to cause the electronic circuit to output the secret value, and to return the electronic circuit to the second operating condition after the secret value has been output;
   wherein, for given circuit operating conditions, the electronic circuit has a stable operating mode if an output value of a particular circuit characteristic is predictable and the electronic circuit has an unstable operating mode if the output value of the particular circuit characteristic is not predictable.

8. The device according to claim 7,
   wherein the first operating condition corresponds to application of a first operating voltage to the electronic circuit and the second operating condition corresponds to application of a second operating voltage to the electronic circuit, the first operating voltage being different from the second operating voltage, and
   wherein the means for controlling the operating condition comprise a power supply, which is configured to switch from the second to the first operating voltage.

9. The device according to claim 7,
   wherein the first operating condition corresponds to application of clock pulses at a first clock rate to the electronic circuit and the second operating condition corresponds to application of clock pulses at a second clock rate to the electronic circuit, the first clock rate being different from the second clock rate, and
   wherein the means for controlling the operating condition comprise a clock generator, which is configured to switch from the second to the first clock rate.

10. The device according to claim 7,
    wherein the first operating condition corresponds to a first operating temperature of the electronic circuit and the second operating condition corresponds to a second operating temperature of the electronic circuit, the first operating temperature being different from the second operating temperature, and
    wherein the means for controlling the operating condition comprise a temperature controller, which is configured to switch the electronic circuit from the second to the first operating temperature.

11. The device according to claim 7, wherein the means for controlling the operating condition are configured to switch momentarily from the second to the first operating condition in response to a control signal requesting the secret value.

12. The device according to claim 7, wherein the electronic circuit comprises a flip-flop, which is metastable in the second operating mode and stable in the first operating mode.

13. A data security device, comprising:
    an electronic circuit having a first, stable operating mode under a first operating condition and a second, unstable operating mode under a second operating condition, the second operating condition being different from the first operating condition, the electronic circuit being configured to output a correct secret value only in the first operating mode; and a controller configured to control the operating condition of the electronic circuit, so as to maintain the electronic circuit initially in the second operating condition, to transfer the electronic circuit to the first operating condition so as to cause the electronic circuit to output the secret value, and to return the electronic circuit to the second operating condition after the secret value has been output;

wherein, for given circuit operating conditions, the electronic circuit has a stable operating mode if an output value of a particular circuit characteristic is predictable and the electronic circuit has an unstable operating mode if the output value of the particular circuit characteristic is not predictable.

14. The device according to claim 13, wherein the first operating condition corresponds to application of a first operating voltage to the electronic circuit and the second operating condition corresponds to application of a second operating voltage to the electronic circuit, the first operating voltage being different from the second operating voltage, and wherein the controller comprises a power supply, which is configured to switch from the second to the first operating voltage.

15. The device according to claim 13, wherein the first operating condition corresponds to application of clock pulses at a first clock rate to the electronic circuit and the second operating condition corresponds to application of clock pulses at a second clock rate to the electronic circuit, the first clock rate being different from the second clock rate, and wherein the controller comprises a clock generator, which is configured to switch from the second to the first clock rate.

16. The device according to claim 13, wherein the first operating condition corresponds to a first operating temperature of the electronic circuit and the second operating condition corresponds to a second operating temperature of the electronic circuit, the first operating temperature being different from the second operating temperature, and wherein the controller comprises a temperature controller, which is configured to switch the electronic circuit from the second to the first operating temperature.

17. The device according to claim 13, wherein the controller is configured to switch momentarily from the second to the first operating condition in response to a control signal requesting the secret value.

18. The device according to claim 13, wherein the electronic circuit comprises a flip-flop, which is metastable in the second operating mode and stable in the first operating mode.

* * * * *